(12) United States Patent
Kim

(10) Patent No.: US 8,586,249 B2
(45) Date of Patent: Nov. 19, 2013

(54) ELECTROLYTE FOR LITHIUM ION SECONDARY BATTERY AND LITHIUM ION SECONDARY BATTERY INCLUDING THE SAME

(75) Inventor: Jin-Hee Kim, Youngin-si (KR)

(73) Assignee: Samsung SDI Co., Ltd., Giheung-gu, Yongin-si, Gyeonggi-do (KR)

(*) Notice: Subject to any disclaimer, the term of this patent is extended or adjusted under 35 U.S.C. 154(b) by 2073 days.

(21) Appl. No.: 11/239,692

(22) Filed: Sep. 30, 2005

(65) Prior Publication Data

US 2006/0073391 A1 Apr. 6, 2006

(30) Foreign Application Priority Data

Oct. 1, 2004 (KR) .................. 10-2004-0078185

(51) Int. Cl.
*H01M 10/0525* (2010.01)
(52) U.S. Cl.
USPC ............................... 429/329; 429/337
(58) Field of Classification Search
USPC ................... 429/231.95, 329, 337
See application file for complete search history.

(56) References Cited

U.S. PATENT DOCUMENTS

| | | | |
|---|---|---|---|
| 6,068,950 A * | 5/2000 | Gan et al. | 429/231.9 |
| 6,475,680 B1 * | 11/2002 | Arai et al. | 429/340 |
| 7,998,623 B2 | 8/2011 | Kim et al. | |
| 2003/0118913 A1 * | 6/2003 | Takami et al. | 429/337 |
| 2003/0157411 A1 | 8/2003 | Jung et al. | |
| 2004/0023950 A1 | 2/2004 | Davey et al. | |
| 2004/0038130 A1 | 2/2004 | Imachi et al. | |
| 2004/0072073 A1 | 4/2004 | Okochi et al. | |
| 2004/0185347 A1 | 9/2004 | Kim et al. | |
| 2005/0026043 A1 | 2/2005 | Kang et al. | |
| 2005/0196664 A1 | 9/2005 | Shimoyamada et al. | |
| 2006/0177742 A1 * | 8/2006 | Abe et al. | 429/330 |
| 2006/0257743 A1 * | 11/2006 | Kuratomi et al. | 429/223 |

FOREIGN PATENT DOCUMENTS

| | | |
|---|---|---|
| JP | 06-150970 | 5/1994 |
| JP | 2002-33117 | 1/2002 |
| JP | 2002-231196 | 8/2002 |
| JP | 2003-208920 | 7/2003 |
| JP | 2003-229168 | 8/2003 |
| JP | 2003-257479 | 12/2003 |
| KR | 10-2001-0082428 A | 8/2001 |
| KR | 10-2004-0018943 A | 3/2004 |
| KR | 10-0467435 | 1/2005 |
| KR | 10-0471970 | 3/2005 |
| WO | WO 2004/021502 | 3/2004 |

OTHER PUBLICATIONS

Korean Office Action issued by Korean Patent Office on Apr. 1, 2011 corresponding to Korean Patent Application No. 10-2004-0078185 and Request for Entry of the Accompanying Office Action attached herewith.
U.S. Appl. No. 11/239,691, filed Sep. 30, 2005.

* cited by examiner

*Primary Examiner* — Mark F Huff
*Assistant Examiner* — Monique Wills
(74) *Attorney, Agent, or Firm* — Robert E. Bushnell, Esq.

(57) ABSTRACT

The electrolyte for a lithium ion secondary battery includes a lithium salt, a non-aqueous organic solvent, gamma-butyrolactone and a wettability activator. The electrolyte for a lithium ion secondary battery provides excellent life characteristics and high-temperature stability and shows improved electrolyte pourability.

18 Claims, 1 Drawing Sheet

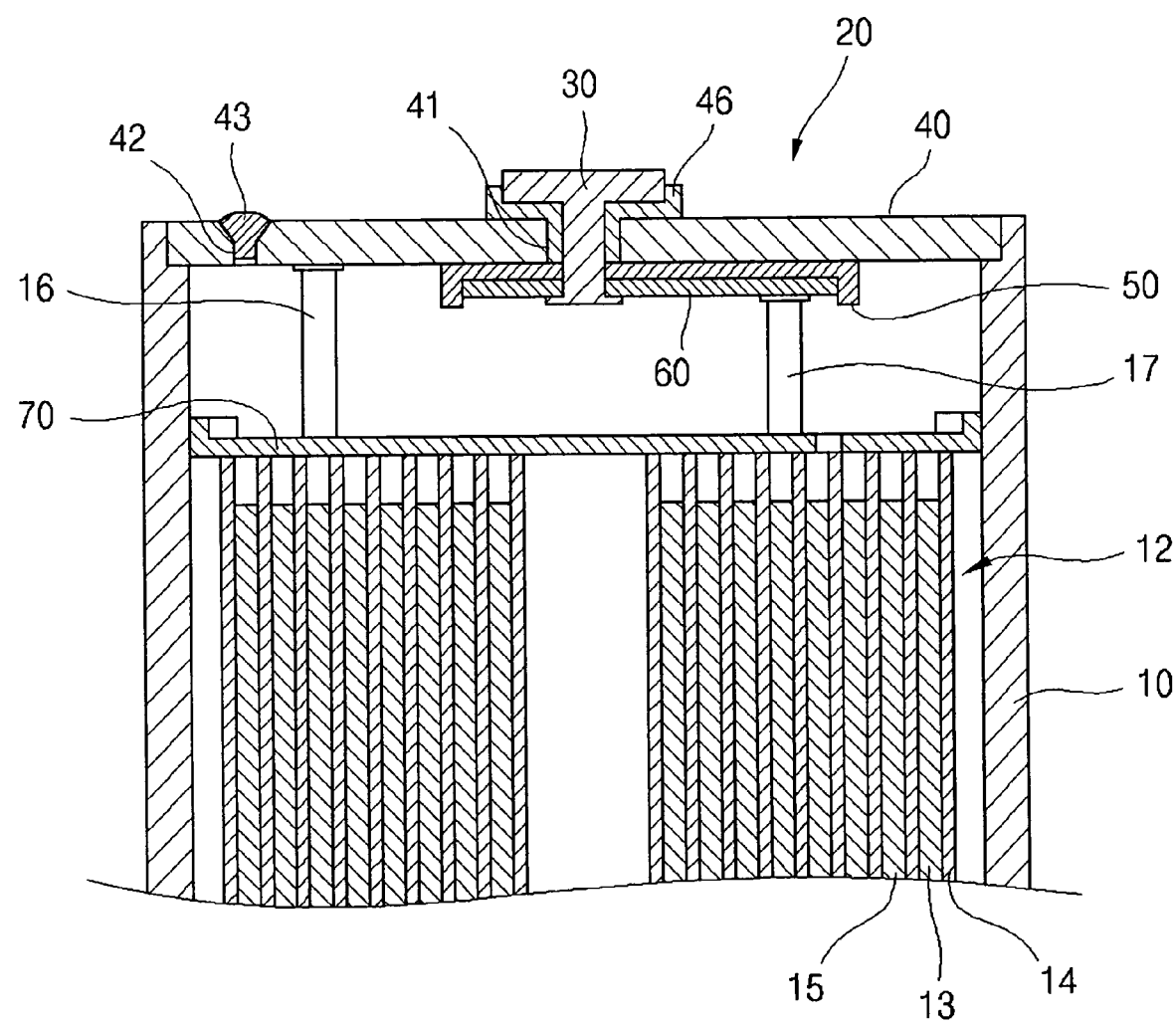

ELECTROLYTE FOR LITHIUM ION SECONDARY BATTERY AND LITHIUM ION SECONDARY BATTERY INCLUDING THE SAME

CLAIM OF PRIORITY

This application makes reference to, incorporates the same herein, and claims all benefits accruing under 35 U.S.C. §119 from an application earlier filed in the Korean Intellectual Property Office on 1 Oct. 2004 and there duly assigned Serial No. 10-2004-0078185.

CROSS-REFERENCE TO RELATED APPLICATION

Furthermore, the present application is related to a co-pending U.S. applications Ser. No. (to be determined), entitled ELECTROLYTE FOR LITHIUM ION SECONDARY BATTERY AND LITHIUM ION SECONDARY BATTERY INCLUDING THE SAME, based upon Korean Patent Application Serial No. 10-2004-0078186 filed in the Korean Intellectual Property Office on 1 Oct. 2004, and filed in the U.S. Patent & Trademark Office concurrently with the present application.

BACKGROUND OF THE INVENTION

1. Field of the Invention

The present invention relates to an electrolyte for a lithium ion secondary battery and a lithium ion secondary battery including the same. More particularly, the present invention relates to an electrolyte for a lithium ion secondary battery, which provides excellent life characteristics and high-temperature stability and shows improved electrolyte pourability, and a lithium ion secondary battery including the same.

2. Description of the Related Art

Recently, as the electronic industry has advanced, technical research into portable and wireless electronic instruments including telephones, video cameras and personal computers has progressed rapidly. Accordingly, as a drive source for these instruments, a secondary battery having a small size, low weight and high energy density is increasingly in demand. Particularly, a non-aqueous electrolyte-based secondary battery is greatly expected to serve as a battery having high voltage and high energy density, wherein the non-aqueous electrolyte-based secondary battery uses a lithium-containing metal oxide providing a voltage of about 4V as a cathode active material and a carbonaceous material capable of lithium intercalation/deintercalation as an anode active material.

Lithium ion secondary batteries have an average charge/discharge voltage of about 2.7 to 4.2V and thus can provide relatively high electric power compared to other alkali batteries, Ni-MH batteries, Ni—Cd batteries, etc. However, in order to obtain such a high drive voltage level, required is an electrolyte composition electrochemically stable in the charge/discharge voltage range of lithium ion secondary batteries. Such electrochemically stable electrolytes may include non-aqueous organic solvents such as ethylene carbonate, propylene carbonate, dimethyl carbonate, ethylmethyl carbonate, diethyl carbonate, etc.

Such lithium ion secondary batteries generally use carbonaceous materials as an anode active material and metal oxides such as $LiCoO_2$ as a cathode active material. Additionally, a porous polyolefin-based separator is inserted between an anode and a cathode, and then a non-aqueous organic solvent containing a lithium salt added thereto is injected to complete the manufacture of a battery. During charge cycles, lithium ions are deintercalated from cathode active materials and then intercalated into carbonaceous layers of anodes. On the contrary, during discharge cycles, lithium ions are deintercalated from anode active materials and then intercalated into cathode active materials.

A lithium ion secondary battery using a non-aqueous organic solvent alone has a problem in that the battery is significantly degraded in terms of stability under overcharge and high-temperature storage conditions.

SUMMARY OF THE INVENTION

Accordingly, the present invention has been made to solve the above-mentioned problems. An object of the present invention is to provide an electrolyte for a lithium ion secondary battery, which provides excellent life characteristics and high-temperature stability and shows improved electrolyte pourability.

Another object of the present invention is to provide a lithium ion secondary battery including the same electrolyte.

In order to accomplish this object, there is provided an electrolyte for a lithium ion secondary battery, the electrolyte including a lithium salt, a non-aqueous organic solvent, gamma-butyrolactone and a wettability activator.

According to another aspect of the present invention, there is provided a lithium ion secondary battery including: an electrolyte according to the present invention, a cathode including a cathode active material capable of lithium ion intercalation/deintercalation, an anode including an anode active material capable of lithium ion intercalation/deintercalation, and a separator interposed between the cathode and anode.

Preferably, GBL is preferably in an amount of 1 to 50 vol %, more preferably 30 to 50 vol %, based on the total volume of the non-aqueous organic solvent.

The wettability activator may be at least one compound selected from the group consisting of dialkyl carbonates represented by the following formula 1 and trialkyl phosphates represented by the following formula 2:

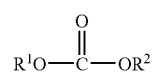

[Formula 1]

wherein each of $R^1$ and $R^2$ independently represents an alkyl group having 3 to 20 carbon atoms.

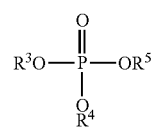

[Formula 2]

wherein each of $R^3$, $R^4$ and $R^5$ independently represents an alkyl group having at least 3 to 20 carbon atoms.

Preferably, the wettability activator is in an amount of 0.1 to 10 wt %, more preferably 1 to 5 wt %, based on the total weight of electrolyte.

The non-aqueous organic solvent may include at least one selected from the group consisting of cyclic carbonates, non-cyclic carbonates, aliphatic carboxylic acid esters, non-cyclic ethers, cyclic ethers and mixtures thereof.

The non-aqueous organic solvents may further include an aromatic hydrocarbon-based organic solvent. Aromatic hydrocarbon-based organic solvents include an aromatic hydrocarbon compound represented by the following formula 3:

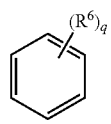

[Formula 3]

wherein $R^6$ is a halogen atom or an alkyl group having 1 to 10 carbon atoms, and q is an integer of 0 to 6.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 1 is a schematic view showing the structure of a lithium ion secondary battery according to the present invention.

DETAILED DESCRIPTION OF THE PREFERRED EMBODIMENTS

An electrolyte for a lithium ion secondary battery preferably includes a lithium salt, a non-aqueous organic solvent, gamma-butyrolactone and a wettability activator.

The electrolyte for a lithium ion secondary battery according to the present invention provides excellent life characteristics and high-temperature stability of a battery and shows improved electrolyte pourability.

Generally, although most non-aqueous organic solvents used in electrolytes having an electrochemically stable composition at a high range of charge/discharge voltage provide excellent battery life characteristics, they show significantly decreased stability under overcharge and high-temperature storage conditions. In order to prevent the above-mentioned problem, GBL is added to electrolytes, according to the present invention. GBL has a freezing point of −45° C. or lower and a boiling point of 204° C. or higher. In other words, GBL can prevent a drop in ion conductivity even at low temperature and shows excellent thermal stability at high temperature. Therefore, GBL has preferred characteristics for electrolytes.

Preferably, GBL is used in an amount of 1 to 50 vol %, preferably 30 to 50 vol %, based on the total volume of the non-aqueous organic solvent. When the content of GBL is less than 1 vol %, it is not possible to improve battery safety under overcharge and high-temperature storage conditions. When the content is greater than 50 vol %, battery safety under overcharge and high-temperature storage conditions may be improved, but battery life characteristics and electrolyte pourability may be degraded due to the increased viscosity of an electrolyte.

Although GBL improves battery safety under overcharge and high-temperature storage conditions, it has high viscosity, and thus increases the viscosity of electrolyte, resulting in a drop in ion conductivity of electrolyte. Additionally, because the electrolyte has such high viscosity, it has a difficulty in infiltrating into a layer of electrode active materials. That is, GBL has high viscosity and thus increases the viscosity of an electrolyte to which GBL is added so that wettability of electrode active materials and separators with an electrolyte may be degraded, resulting in an increase in time needed for injection of an electrolyte, and life characteristics of a battery may be also degraded. Further, such high-viscosity electrolytes may cause defects in battery products related with electrolyte injection, thereby reducing productivity.

In order to prevent degradation in battery life characteristics and in electrolyte pourability, caused by the addition of GBL, a wettability activator is further added according to the present invention. Such wettability activators are referred to as compounds that decrease the viscosity of an electrolyte so that the infiltration rate of an electrolyte into a layer of electrode active materials can be improved. The wettability activator should not adversely affect other characteristics of a battery. Further, the wettability activator must be a compound stable at the drive voltage range of a battery.

The wettability activator may be at least one compound selected from the group consisting of dialkyl carbonates represented by the following formula 1 and trialkyl phosphates represented by the following formula 2:

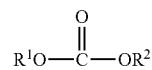

[Formula 1]

wherein each of $R^1$ and $R^2$ independently represents an alkyl group having 3 to 20 carbon atoms.

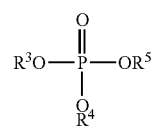

[Formula 2]

wherein each of $R^3$, $R^4$ and $R^5$ independently represents an alkyl group having at least 3 to 20 carbon atoms.

The alkyl group in the above dialkyl carbonates preferably has 3 to 20 carbon atoms. When the alkyl group has carbon atoms in a number of less than 3, it is not possible to improve battery life characteristics and electrolyte pourability. When the alkyl group has carbon atoms in a number of more than 20, the compound may be composed under high-temperature storage conditions, followed by generation of gas. Therefore, in the latter case, there is an additional problem in that a battery may be swelled, resulting in degradation in life characteristics at high temperature.

Particular examples of the dialkyl carbonates include di-n-butyl carbonate, dipentyl carbonate, dihexyl carbonate, diheptyl carbonate, dioctyl carbonate, etc. Most preferably, di-n-butyl carbonate is used.

The alkyl group in the above trialkyl phosphates preferably has 3 to 20 carbon atoms. When the alkyl group has carbon atoms in a number of less than 3, it is not possible to improve battery life characteristics and electrolyte pourability. When the alkyl group has carbon atoms in a number of more than 20, the compound may be composed under high-temperature storage conditions, followed by generation of gas. Therefore, in the latter case, there is an additional problem in that a battery may be swelled, resulting in degradation in life characteristics at high temperature.

Particular examples of the trialkyl phosphates include tributyl phosphate, tripentyl phosphate, trihexyl phosphate, triheptyl phosphate, trioctyl phosphate, etc. Most preferably, tributyl phosphate and trioctyl phosphate are used.

Preferably, the wettability activator is used in an amount of 0.1 to 10 wt %, preferably 1 to 5 wt %, based on the total weight of electrolyte. When the content of the additive is less than 0.1 wt %, it is not possible to improve battery life characteristics and electrolyte pourability. Even if the content is greater than 10 wt %, there is a limitation in improvement of the time needed for injecting an electrolyte. More particularly, even if the additive is added in an amount of much greater than 10 wt %, it is not possible to improve electrolyte pourability any more. Moreover, it is not cost-efficient to increase the amount of a wettability activator.

The wettability activator can decrease the surface tension of an electrolyte having an increased viscosity caused by the addition of GBL, and thus increases the infiltration rate of the electrolyte into an electrode plate and separator. Additionally, such increased infiltration property can improve the battery life characteristics as well as electrolyte pourability.

The electrolyte according to the present invention includes a non-aqueous organic solvent and a lithium salt in addition to the above compounds. The non-aqueous organic solvent functions as a medium through which ions participating in electrochemical reactions in a battery can move. The non-aqueous organic solvent includes at least one selected from the group consisting of cyclic carbonates, non-cyclic carbonates, aliphatic carboxylic add esters, non-cyclic ethers, cyclic ethers and mixtures thereof.

Particular examples of the cyclic carbonates include ethylene carbonate, propylene carbonate, butylene carbonate, vinylene carbonate, etc.

Particular examples of the non-cyclic carbonates include dimethyl carbonate, diethyl carbonate, ethyl methyl carbonate, methyl propyl carbonate, ethyl propyl carbonate, dipropyl carbonate, methyl ethyl carbonate, etc.

Particular examples of the aliphatic carboxylic add esters include methyl formate, methyl acetate, methyl propionate, ethyl propionate, etc.

Particular examples of the non-cyclic ethers include 1,2-dimethoxyethane, 1,2-diethoxyethane, ethoxymethoxyethane, etc.

Particular examples of the cyclic ethers include tetrahydrofuran, 2-methyltetrahydrofuran, etc.

The non-aqueous organic solvents may further include an aromatic hydrocarbon-based organic solvent. Aromatic hydrocarbon-based organic solvents include an aromatic hydrocarbon compound represented by the following formula 3:

[Formula 3]

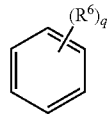

wherein $R^6$ is a halogen atom or an alkyl group having 1 to 10 carbon atoms, and q is an integer of 0 to 6.

Particular examples of the aromatic hydrocarbon-based organic solvent include benzene, fluorobenzene, bromobenzene, chlorobenzene, toluene, xylene, mesitylene, etc., each being used alone or in combination. When the non-aqueous organic solvent further includes an aromatic hydrocarbon-based organic solvent, the volume ratio of the carbonate solvent to the aromatic hydrocarbon solvent is preferably 1:1 to 30:1 in order to obtain preferred characteristics of the electrolyte.

The lithium salt contained in the electrolyte serves as a source for supplying lithium ions in a battery and empowers a lithium ion secondary battery to perform basic functions. The lithium salt is any one selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_4$, $LiAlCl_4$, $LiN(C_xF_{2x+1}SO_2)(C_yF_{2y+1}SO_2)$ (wherein, each of x and y is a natural number), LiCl and LiI, or a mixture containing two or more of them.

Hereinafter, a lithium ion secondary battery using the electrolyte for lithium ion secondary battery according to the present invention will be explained in more detail.

The lithium ion secondary battery using the electrolyte according to present invention includes a cathode, an anode and a separator. The cathode includes a cathode active material capable of reversible lithium ion intercalation/deintercalation. Such cathode active materials may include a lithiated intercalation oxide.

The anode includes an anode active material capable of lithium ion intercalation/deintercalation. Such anode active materials may include crystalline or amorphous carbon, carbonaceous anode active materials derived from carbon composites (pyrolyzed carbon, coke, graphite), burned organic polymer compounds, carbon fiber, tin oxide compounds, lithium metal and lithium alloys.

Slurry containing the active material is coated on a collector formed of metal foil. Otherwise, the active material itself is applied in the form of a film. The separator, which prevents a short circuit between a cathode and an anode in a lithium ion secondary battery, may include any materials known to one skilled in the art. The separator includes a polymer film such as a polyolefin, polypropylene or polyethylene film, a multi-layered film thereof, a microporus film, woven web and non-woven web.

The lithium ion secondary battery including the electrolyte, cathode, anode and separator as described above may be formed into a unit cell having the structure of cathode/separator/anode, a bi-cell having the structure of cathode/separator/anode/ separator, or a laminate cell in which the structure of unit cell is repeated several times.

Hereinafter, a preferred embodiment of the present invention will be described with reference to FIG. 1. Referring to FIG. 1, the lithium ion secondary battery is obtained by introducing an electrode assembly including a cathode 13, an anode 15 and a separator 14 that interposes between the cathode 13 and the anode 15 into a can 10 along with an electrolyte, and then sealing the top of the can 10 with a cap assembly 20. The cap assembly 20 includes a cap plate 40, an insulating plate 50, a terminal plate 60 and an electrode terminal 30. Additionally, the cap assembly 20 is coupled with an insulation case 70 to seal the can 10.

The electrode terminal 30 is inserted into a through hole 41 formed at the center of the cap plate 40. When the electrode terminal 30 is inserted into the through hole 41, a tube-shaped gasket 46 is coupled to the outer surface of the electrode terminal 30 so as to make electric insulation between the electrode terminal 30 and the cap plate 40, and thus is inserted into the through hole 41 along with the electrode terminal 30. After the cap assembly is mounted on the top of the cap 10, the electrolyte is injected through an inlet 42 and then the inlet 42 is sealed with a stopper 43.

The electrode terminal 30 is connected to an anode tab 17 of the anode 15 or to a cathode tab 16 of the cathode 13, thereby functioning as an anode terminal or a cathode terminal.

The lithium ion secondary battery according to the present invention is not limited to the above-described shape but may have any other shape applicable to a battery, including a cylindrical shape, pouch shape, etc.

Reference will now be made in detail to the preferred embodiments of the present invention. It is to be understood that the following examples are illustrative only and the present invention is not limited thereto.

EXAMPLE 1

Artificial graphite as an anode active material was suspended in aqueous carboxymethyl cellulose solution and styrene-butadiene rubber as a binder was added thereto to form slurry of anode active material. The slurry was coated on copper foil having a thickness of 10 μm, dried and rolled to provide an anode.

$LiCoO_2$ as a cathode active material, polyvinylidene fluoride as a binder and carbon as a conductive agent were dispersed in N-methyl-2-pyrrolidone as a solvent to form slurry of cathode active material. The slurry was coated on aluminum foil having a thickness of 15 μm, dried and rolled to provide a cathode.

The cathode and the anode obtained as described above were wound and compressed together with a separator made of polyethylene and having a thickness of 16 μm and then the resultant unit cell was inserted into a prismatic can having a size of 46 mm×34 mm×50 mm.

Next, an electrolyte was added to the can to provide a lithium secondary battery. The electrolyte was prepared by adding 1.0M of $LiPF_6$ to a mixed solvent containing ethylene carbonate and ethylmethyl carbonate (wherein volume ratio of EC:EMC=3:7) to form a mixture, and further adding to the resultant mixture, 30 vol % of gamma-butyrolactone based on the total volume of non-aqueous organic solvent and 1 wt % of di-n-butylcarbonate based on the total weight of electrolyte.

EXAMPLE 2

Example 1 was repeated, except that 3 wt % of di-nbutylcarbonate was added.

EXAMPLE 3

Example 1 was repeated, except that 5 wt % of di-n-butyl carbonate was added.

EXAMPLE 4

Example 1 was repeated, except that 7 wt % of di-n-butyl carbonate was added.

EXAMPLE 5

Example 1 was repeated, except that added were 50 vol % of gamma-butyrolactone and 5 wt % of di-nutyl carbonate.

EXAMPLE 6

Example 1 was repeated, except that added were 70 vol % of gamma-butyrolactone and 10 wt % of di-nutyl carbonate.

EXAMPLE 7

Example 1 was repeated, except that 3 wt % of tributyl phosphate was added instead of di-n-butyl carbonate.

EXAMPLE 8

Example 1 was repeated, except that 3 wt % of trioctyl phosphate was added instead of di-n-butyl carbonate.

COMPARATIVE EXAMPLE 1

Example 1 was repeated, except that neither gamma-butyrolactone nor the additive was added to the electrolyte.

COMPARATIVE EXAMPLE 2

Example 1 was repeated, except that 5 wt % of di-n-butyl carbonate was added to the electrolyte containing no gamma-butyrolactone.

COMPARATIVE EXAMPLE 3

Example 1 was repeated, except that di-n-butyl carbonate was not added to the electrolyte.

COMPARATIVE EXAMPLE 4

Example 1 was repeated, except that 60 vol % of gamma-butyrolactone was added to the electrolyte containing no di-n-butyl carbonate.

EXPERIMENTAL EXAMPLE

When manufacturing each of the batteries according to Examples 1 to 8 and Comparative Examples 1 to 4, the time needed for injecting each electrolyte was measured.

The batteries obtained from Examples 1 to 8 and Comparative Examples 1 to 4 (battery capacity 1 C=790 mAh) were charged under constant current-constant voltage (CC-CV) conditions with a current of 158 mA to a charged voltage of 4.2 V, and left for 1 hour. Then, the batteries were discharged at 395 mA to 2.75 V and left for 1 hour. After the above charge/discharge cycle was repeated three times, the batteries were charged again at a current of 395 mA for 3 hours to a charged voltage of 4.2 V.

High-temperature storage characteristics were determined by storing each battery for 1 hour at 150° C. and checking the condition of each battery.

Additionally, a life test was performed as follows. Each battery was subjected to 1 C/4.2V constant current-constant voltage (CC-CV) charge, 0.1 C cut-off charge and 1 C/3.0V cutoff discharge. The capacity maintenance (%) at each cyde was calculated by using the formula of [(discharge capacity at a given cycle)/(discharge capacity at the first cycle)]×100 (%).

Further, overcharge characteristics were determined by overcharging each battery to a voltage of 12V at 1 C.

Each of the secondary batteries according to Examples 1 through 8 and Comparative Examples 1 through 4 was tested to determine electrolyte pouring time, capacity maintenance and characteristics under overcharge and high-temperature storage conditions. The following Table 1 shows the test results.

TABLE 1

| | Base Electrolyte | GBL (vol %) | Wettability Activator (wt %) | Pouring Time (min) | Capacity maintenance(%) 300 cycle | 1 C./12 V Overcharge | 150° C./1 h high-temperature storage |
|---|---|---|---|---|---|---|---|
| Ex. 1 | 1M LiPF$_6$ | 30 | DNBC 1 | 8 | 70 | 7L0, 3L5 | 7L0, 3L5 |
| Ex. 2 | EC/EMC = | 30 | DNBC 3 | 7 | 73 | 9L0, 1L5 | 8L0, 2L5 |
| Ex. 3 | 3/7 vol % | 30 | DNBC 5 | 5 | 80 | 8L0, 2L4 | 10L0 |
| Ex. 4 | | 30 | DNBC 7 | 4 | 85 | 8L0, 2L3 | 10L0 |
| Ex. 5 | | 50 | DNBC 5 | 5 | 70 | 10L0 | 10L0 |
| Ex. 6 | | 70 | DNBC 10 | 5 | 50 | 10L0 | 10L0 |
| Ex. 7 | | 30 | Tri-butyl phosphate 3 | 5.5 | 80 | 8L0, 2L5 | 10L0 |
| Ex. 8 | | 30 | Tri-octyl phosphate 3 | 4.5 | 83 | 9L0, 1L5 | 10L0 |
| Comp. Ex. 1 | | — | — | 4 | 90 | 10L5 | 10L5 |
| Comp. Ex. 2 | | — | DNBC 5 | 4 | 89 | 10L5 | 10L5 |
| Comp. Ex. 3 | | 30 | — | 15 | 50 | 8L0, 2L5 | 8L0, 2L4 |
| Comp. Ex. 4 | | 60 | — | 20 | 30 | 10L0 | 10L0 |

DNBC used as a wettability activator in the above Examples and Comparative Examples means di-n-butyl carbonate. Each of "L0" through "L5" represents a safety grade evaluated under overcharge and high-temperature storage conditions. More particularly, "L0" means "excellent", "L1" means "leakage", "L2" means "flash", "L3" means "smoke", "L4" means "ignition", and "L5" means "explosion". The number preceding "L" means the number of cells used in this test.

As shown in Table 1, the battery using neither GBL nor wettability activator according to Comparative Example 1 caused degradation in battery quality under overcharge and high-temperature storage conditions, even if it shows good pouring time and life characteristics. When DNBC additive was added to the base electrolyte solvent according to Comparative Example 2, addition of the wettability activator did not cause degradation in battery life characteristics. Further, Comparative Example 2 shows that addition of the wettability activator does not adversely affect the battery safety.

When 30 vol % of GBL was added to the base electrolyte solvent according to Comparative Example 3, battery safety was improved compared to Comparative Examples 1 and 2 using no gamma-butyrolactone. However, infiltration rate of the electrolyte into an electrode plate and a separator was decreased due to the high viscosity of GBL, resulting in degradation in battery life characteristics and an increase in electrolyte pouring time. When 50 vol % of GBL was added according to Comparative Example 4, battery safety was improved compared to Comparative Example 3 using 30 vol % of GBL, but pouring time and capacity maintenance were degraded.

Each of the batteries according to Examples 1 to 6 was tested to determine battery quality depending on variation in contents of GBL and DNBC. When the amount of GBL was increased, battery quality under overcharge and high-temperature storage conditions could be improved. However, pouring time was increased and battery life characteristics were degraded. When 70 vol % of GBL was added according to Example 6, capacity maintenance was rapidly decreased.

Examples 1 to 6 show that electrolyte pouring time decreases in proportion to an increase in amount of DNBC additive. However, there is an optimal point of pouring time. In other words, if the amount of DNBC exceeds a certain limit, pouring time cannot be reduced any more.

Each of Examples 7 and 8 uses a trialkyl phosphate, i.e., tributyl phosphate and trioctyl phosphate, respectively, instead of DNBC as a wettability activator. In both Examples, electrolyte pouring time can be reduced in the same manner as Examples 1 to 6 using a dialkyl carbonate, i.e., DNBC.

As can be seen from the foregoing, the lithium ion secondary battery using the electrolyte, to which GBL for improving battery safety under overcharge and high-temperature storage conditions and a wettability activator for increasing electrolyte infiltration property are added, according to the present invention, provides excellent battery life characteristics and safety and shows excellent electrolyte pourability.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An electrolyte for a lithium ion secondary battery, comprising:
   a lithium salt;
   a non-aqueous organic solvent;
   gamma-butyrolactone in an amount of 1 to 30 vol % based on the total volume of the non-aqueous organic solvent; and
   a wettability activator comprising at least one selected from the group consisting of dialkyl carbonate represented by Formula 1 and trialkyl phosphate represented by Formula 2:

[Formula 1]

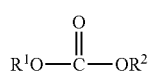

where each of $R^1$ and $R^2$ independently represents an alkyl group having 3 to 20 carbon atoms; and

[Formula 2]

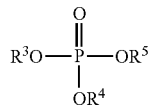

where each of $R^3$, $R^4$ and $R^5$ independently represents an alkyl group having at least 3 to 20 carbon atoms.

2. An electrolyte for a lithium ion secondary battery as claimed in claim 1, the wettability activator being the trialkyl phosphate represented by Formula 2.

3. An electrolyte for a lithium ion secondary battery as claimed in claim 1, the dialkyl carbonate being at least one selected from the group consisting of di-n-butyl carbonate, dipentyl carbonate, dihexyl carbonate, diheptyl carbonate and dioctyl carbonate.

4. An electrolyte for a lithium ion secondary battery as claimed in claim 2, the trialkyl phosphate being at least one selected from the group consisting of tributyl phosphate, tripentyl phosphate, trihexyl phosphate, triheptyl phosphate and trioctyl phosphate.

5. An electrolyte for a lithium ion secondary battery as claimed in claim 1, the wettability activator being in an amount of 0.1 to 10 wt % based on the total weight of the electrolyte.

6. An electrolyte for a lithium ion secondary battery as claimed in claim 1, the non-aqueous organic solvent being at least one selected from the group consisting of cyclic carbonates, non-cyclic carbonates, aliphatic carboxylic acid esters, non-cyclic ethers and cyclic ethers.

7. An electrolyte for a lithium ion secondary battery as claimed in claim 6, the cyclic carbonate being at least one selected from the group consisting of ethylene carbonate, propylene carbonate, butylene carbonate and vinylene carbonate, the non-cyclic carbonate being at least one selected from the group consisting of dimethyl carbonate, diethyl carbonate, ethyl methyl carbonate, methyl propyl carbonate, ethyl propyl carbonate, dipropyl carbonate and methyl ethyl carbonate, the aliphatic carboxylic acid ester being at least one selected from the group consisting of methyl formate, methyl acetate, methyl propionate and ethyl propionate, the non-cyclic ether being at least one selected from the group consisting of 1,2-dimethoxyethane, 1,2-diethoxyethane and ethoxymethoxyethane, and the cyclic ether being at least one selected from the group consisting of tetrahydrofuran and 2-methyltetrahydrofuran.

8. An electrolyte for a lithium ion secondary battery as claimed in claim 1, the non-aqueous organic solvent further including an aromatic hydrocarbon-based organic solvent.

9. An electrolyte for a lithium ion secondary battery as claimed in claim 8, the aromatic hydrocarbon-based organic solvent being an aromatic hydrocarbon compound represented by Formula 3:

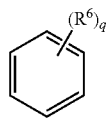

[Formula 3]

where $R^6$ is a halogen atom or an alkyl group having 1 to 10 carbon atoms, and q is an integer of 0 to 6.

10. An electrolyte for a lithium ion secondary battery as claimed in claim 9, the aromatic hydrocarbon-based organic solvent being at least one solvent selected from the group consisting of benzene, fluorobenzene, chlorobenzene, bromobenzene, toluene, xylene, mesitylene and mixtures thereof.

11. An electrolyte for a lithium ion secondary battery as claimed in claim 1, the non-aqueous organic solvent comprising a carbonate solvent and an aromatic hydrocarbon-based organic solvent, and the ratio of the carbonate solvent to the aromatic hydrocarbon-based organic solvent is in the range of 1:1 to 30:1.

12. An electrolyte for a lithium ion secondary battery as claimed in claim 1, the lithium salt being any one selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_4$, $LiAlCl_4$, $LiN(C_xF_{2x+1}SO_2)(C_yF_{2y+1}SO_2)$(each of x and y being a natural number), LiCl, LiI and a mixture containing at least two of them.

13. A lithium ion secondary battery, comprising:
an electrolyte comprising:
a lithium salt;
a non-aqueous organic solvent;
gamma-butyrolactone in an amount of 1 to 30 vol % based on the total volume of the non-aqueous organic solvent; and
a wettability activator comprising at least one selected from the group consisting of dialkyl carbonate represented by Formula 1 and trialkyl phosphate represented by Formula 2:

[Formula 1]

where each of $R^1$ and $R^2$ independently represents an alkyl group having 3 to 20 carbon atoms; and

[Formula 2]

where each of $R^3$, $R^4$ and $R^5$ independently represents an alkyl group having at least 3 to 20 carbon atoms;
a cathode comprising a cathode active material capable of reversibly intercalating and deintercalating lithium ion;
an anode comprising an anode active material capable of reversibly intercalating and deintercalating lithium ion; and
a separator disposed between the cathode and the anode.

14. A lithium ion secondary battery as claimed in claim 13, the cathode active material being a lithiated intercalation oxide.

15. A lithium ion secondary battery as claimed in claim 13, the anode active material being selected from the group consisting of crystalline carbon, amorphous carbon, carbon composites and lithium metal.

16. An electrolyte for a lithium ion secondary battery, comprising:
a lithium salt;
a non-aqueous organic solvent comprising at least one selected from the group consisting of cyclic carbonates, non-cyclic carbonates, aliphatic carboxylic acid esters, non-cyclic ethers and cyclic ethers;
gamma-butyrolactone in an amount of 1 to 30 vol % based on the total volume of the non-aqueous organic solvent; and
a wettability activator comprising at least one selected from the group consisting of dialkyl carbonate represented by Formula 1 and trialkyl phosphate represented by Formula 2, the wettability activator being in an amount of 0.1 to 10 wt % based on the total weight of the electrolyte:

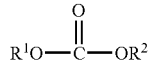
[Formula 1]

where each of $R^1$ and $R^2$ independently represents an alkyl group having 3 to 20 carbon atoms; and

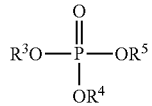
[Formula 2]

where each of $R^3$, $R^4$ and $R^5$ independently represents an alkyl group having at least 3 to 20 carbon atoms.

17. The electrolyte of claim 16, the dialkyl carbonate being represented by Formula 1:

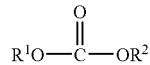
[Formula 1]

where each of $R^1$ and $R^2$ independently represents an alkyl group having 3 to 20 carbon atoms.

18. The electrolyte of claim 16, the trialkyl carbonate being represented by Formula 2:

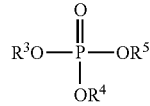
[Formula 2]

where each of $R^3$, $R^4$ and $R^5$ independently represents an alkyl group having at least 3 to 20 carbon atoms.

* * * * *